(No Model.)
E. A. SPERRY.
ELECTRO-CONDUCTING BEARING FOR TROLLEY OR OTHER WHEELS.
No. 505,994. Patented Oct. 3, 1893.
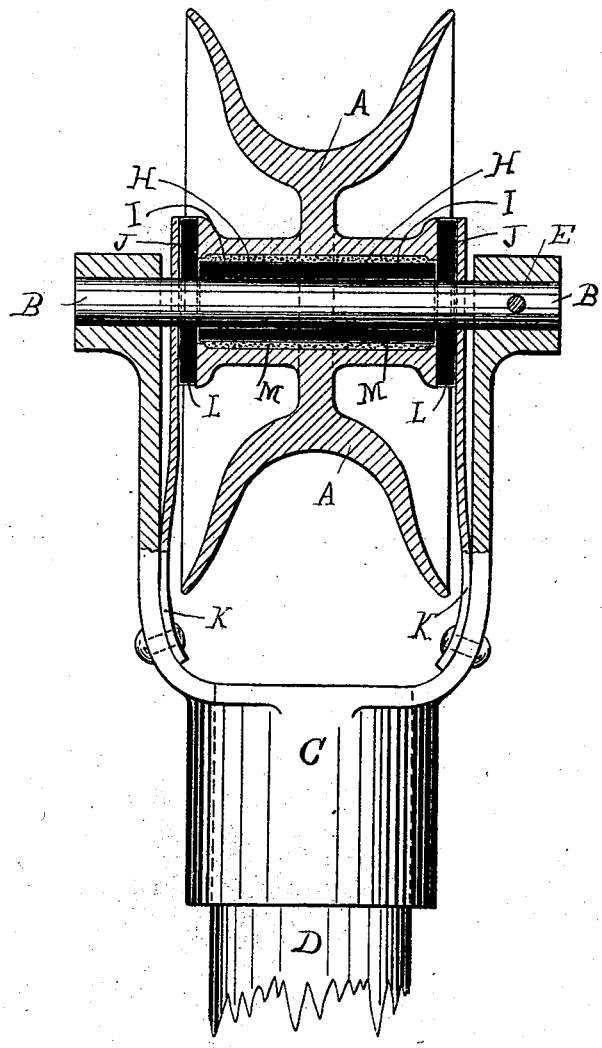

UNITED STATES PATENT OFFICE.

ELMER A. SPERRY, OF CHICAGO, ILLINOIS, ASSIGNOR TO FRANK R. GREENE, OF SAME PLACE.

ELECTRO-CONDUCTING BEARING FOR TROLLEY OR OTHER WHEELS.

SPECIFICATION forming part of Letters Patent No. 505,994, dated October 3, 1893.

Application filed September 17, 1891. Renewed February 21, 1893. Serial No. 463,260. (No model.)

*To all whom it may concern:*

Be it known that I, ELMER A. SPERRY, a citizen of the United States, residing at Chicago, in the county of Cook, and State of Illinois, have invented a new and useful Improvement in Electro-Conducting Bearings for Trolley or other Wheels, of which the following is a full, clear, and exact specification.

My invention relates to a new bushing for the bearing of a wheel obviating the necessity of liquid lubrication, and it consists in a novel use and arrangement of the material as hereinafter specified and claimed.

The figure shows a sectional view of a wheel with the bushings in place.

A represents a wheel supported on the rod B which I have found may consist of various substances, such as steel, bronze, or copper; hard-drawn or tempered copper is somewhat preferable to steel, especially if the current of electricity is to be transmitted through the bearing.

C is any suitable support for the stem in this case shown as a trolley "harp" with the end of the trolley pole shown at D. The pin E prevents the stud B from rotating. The wheel is bored larger than the stud, and between the two is placed a bushing H which consists of carbon. I may use ordinary electric light carbon, but I prefer to use that particular quality of carbon which is employed for commutator brushes, especially when a copper or bronze stud is used upon which the bushing revolves. This bushing of carbon I find it preferable to coat by electro deposition of copper shown at I. Carbon in some forms is brittle, and this copper, while increasing its conductivity, tends to strengthen the same.

J J represent buttons of the same material, slipped loosely upon the stud B and pressed against the end of the hub of the wheel by the springs K K. These buttons are electroplated with copper, shown at L, which also tends to make a better contact between the spring K and the button. I find in using this form of bushing no liquid lubrication is required; the stud is soon coated over with a graphite-like substance which renders its surface perfectly smooth. In fact I find that incorporating graphite to a more or less extent into the material from which carbon brushes are made, increases their qualities for the use as a bushing in the manner described. The bushing H may be driven into the wheel A, or I may split the wheel and after inserting the bushing draw the parts together, or if a solid wheel is used I may put the bushing in place by the use of cement or soft metal shown at M upon its exterior and between the bushing and the wheel; this last method is preferable. It will readily be seen that the operation will not be essentially affected if the buttons J are entirely removed or if only one be used. Although it is designed to use all these features in connection with one another, yet it is obvious that some of them may be used without the others, and the invention extends to such use.

What I claim as new, and desire to secure by Letters Patent, is—

1. An electrical conducting cylinder, an encircling contactor or "brush" for such cylinder which consists of commutator brush carbon and which extends entirely around the cylinder, means for relative rotation between the cylinder and the inclosing brush about the axis of the cylinder, in combination with an electric circuit a part of which the cylinder and brush form.

2. A wheel and stud upon which the wheel may turn in combination with collars at the end or ends of the hub of the wheel, which consist of commutator brush carbon.

3. A wheel and stud upon which the wheel may turn, in combination with bearings for the wheel consisting of commutator brush carbon, collars upon the end or ends of the hub of the wheel consisting of buttons of commutator brush carbon, and a following spring to hold the buttons against the hub of the wheel.

4. A wheel and stud upon which the wheel may turn, in combination with bearings for the wheel consisting of commutator brush carbon, collars upon the end or ends of the hub of the wheel consisting of buttons of commutator brush carbon, and a following spring to hold the buttons against the hub of the wheel, said buttons being electro-plated with metal upon one face.

5. A wheel and stud upon which the wheel may turn, in combination with bearings for the wheel consisting of commutator brush carbon, collars upon the end or ends of the hub of the wheel consisting of buttons of commutator brush carbon, and a following spring to hold the buttons against the hub of the wheel, said buttons being electro-plated upon one face and the external edge thereof.

6. A wheel and stud upon which the wheel may turn, a bushing for the wheel consisting of commutator brush carbon, in combination with a stationary stud upon which the wheel may turn consisting of copper or copper-like bronze.

7. A stud upon which a wheel may turn loosely inclosed by a bushing consisting of commutator brush carbon, a wheel inclosing same in combination with cement or interposed metal M between the exterior of the bushing and the wheel.

ELMER A. SPERRY.

Witnesses:
W. R. GOODMAN,
M. NIELSON.